No. 773,110. PATENTED OCT. 25, 1904.
M. WICKSTROM.
MAIL BOX.
APPLICATION FILED APR. 14, 1904.
NO MODEL. 3 SHEETS—SHEET 1.
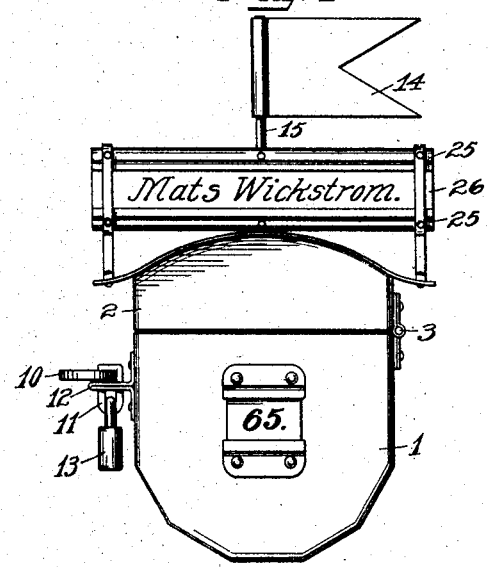
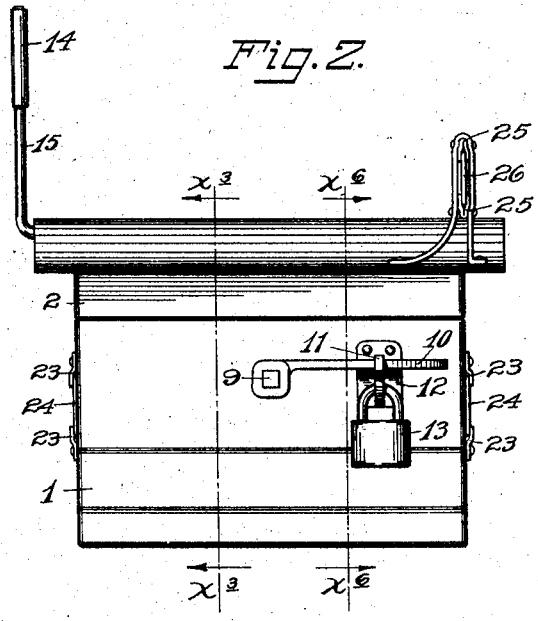
Witnesses.
Inventor.
Mats Wickstrom.
By his Attorneys No. 773,110. PATENTED OCT. 25, 1904.
M. WICKSTROM.
MAIL BOX.
APPLICATION FILED APR. 14, 1904.
NO MODEL. 3 SHEETS—SHEET 2.
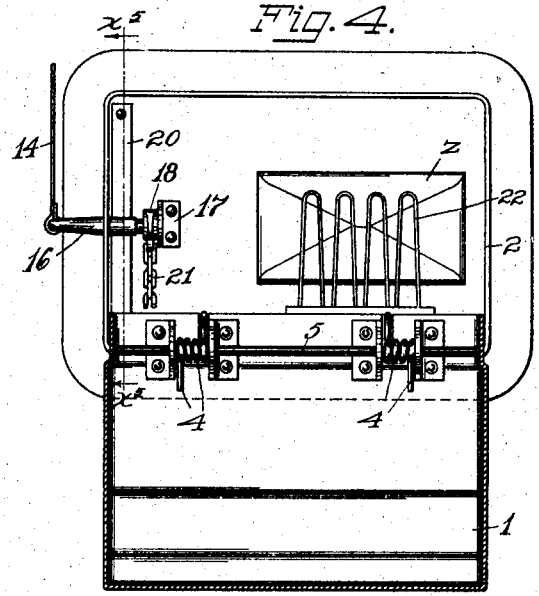
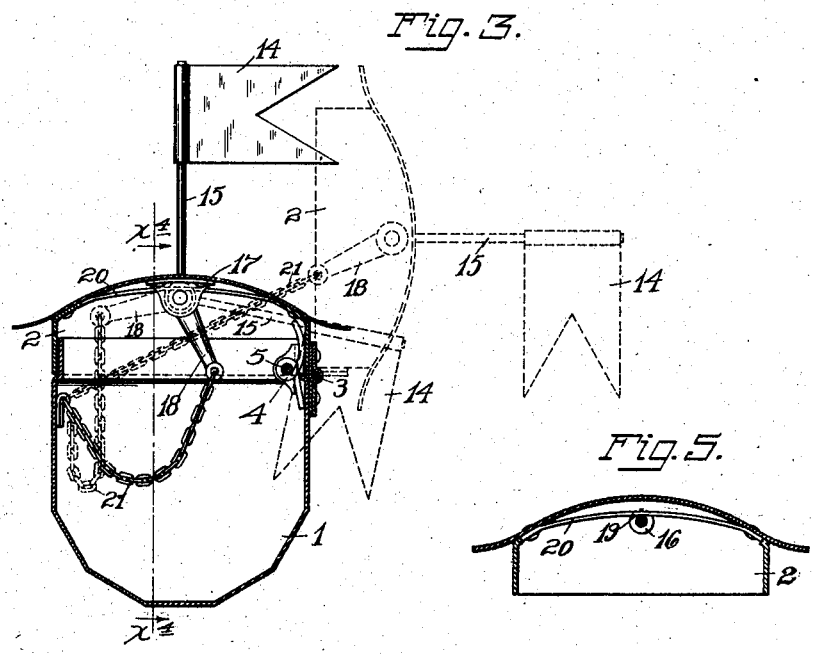
Witnesses.
E. W. Jeppesen.
H. D. Kilgore
Inventor.
Mats Wickstrom
By his Attorneys
Williamson & Merchant No. 773,110. PATENTED OCT. 25, 1904.
M. WICKSTROM.
MAIL BOX.
APPLICATION FILED APR. 14, 1904.
NO MODEL. 3 SHEETS—SHEET 3.

Witnesses.
E. W. Jeppson.
H. D. Kilgore.

Inventor:
Mats Wickstrom.
By his Attorneys.
Williamson & Mucha

No. 773,110.

Patented October 25, 1904.

UNITED STATES PATENT OFFICE.

MATS WICKSTROM, OF NORTHBRANCH, MINNESOTA

MAIL-BOX.

SPECIFICATION forming part of Letters Patent No. 773,110, dated October 25, 1904.

Application filed April 14, 1904. Serial No. 203,189. (No model.)

*To all whom it may concern:*

Be it known that I, MATS WICKSTROM, a citizen of the Kingdom of Sweden, residing at Northbranch, in the county of Chisago and State of Minnesota, have invented certain new and useful Improvements in Mail-Boxes; and I do hereby declare the following to be a full, clear, and exact description of the invention, such as will enable others skilled in the art to which it appertains to make and use the same.

My invention has for its object to provide an improved mail-box especially adapted for use on rural-delivery routes; and to the above ends the invention consists of the novel devices and combinations of devices hereinafter described, and defined in the claims.

The invention is illustrated in the accompanying drawings, wherein like characters indicate like parts throughout the several views.

Figure 6:
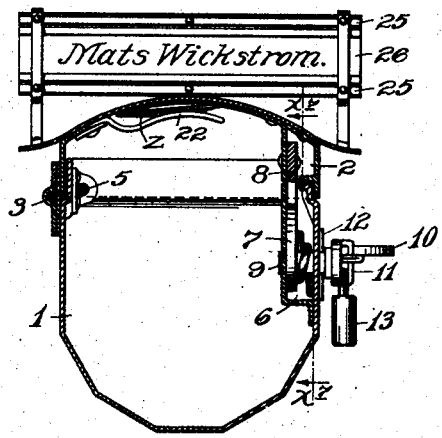
Figure 7:
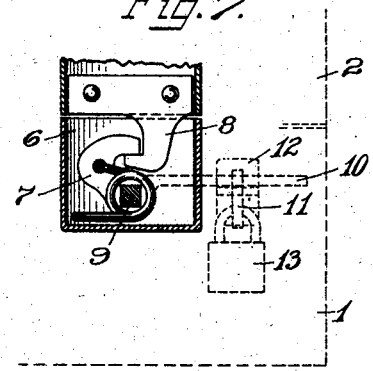

Figure 1 shows the complete box in end elevation. Fig. 2 shows the box in side elevation. Fig. 3 is a transverse vertical section taken through the box on the line $x^3 x^3$ of Fig. 2. Fig. 4 is a longitudinal vertical section taken through the box approximately on the line $x^4 x^4$ of Fig. 3, the cover of the box being shown as turned into an open position, as indicated by dotted lines in said Fig. 3. Fig. 5 is a detail in section approximately on the line $x^5 x^5$ of Fig. 4. Fig. 6 is a transverse vertical section taken approximately on the line $x^6 x^6$ of Fig. 2, and Fig. 7 is a detail in section on the line $x^7 x^7$ of Fig. 6.

Preferably the entire box is constructed of sheet metal, such as galvanized iron; but it may of course be made up of cast sections. The box is made up principally of a pocket-like body-section 1 and a hinged top or cover-section 2, the former of which will be rigidly supported in any suitable way. The top or cover 2 overlaps the marginal upper edge of the body-section 1 when closed, and is provided upon all four sides with projecting eaves, which serve to shed rain. The said cover 2 is hinged to the back of the body 1 at 3 and is put under strain to open automatically when released by coiled springs 4, shown as mounted on a supporting-rod 5, secured within the body 1. The springs 4 at one end press against the side of the body 1 and at their other end press against the rear side of the top or cover 2.

Mounted within a small pocket 6 on the front wall of the body 1 is a spring-pressed latch 7, which coöperates with a hook 8 on the forward flange of the cover 2 to lock the said cover in a closed position. The latch 7 is provided with a stem 9, which projects outward through the front of the body or box 1, and has secured to it a releasing-lever 10. The releasing-lever 10 is provided with a depending staple 11, which works through a slot in a lock-bracket 12, secured on the outer front plate of the box or body 1. The staple of a padlock 13, when passed through the staple 11, as indicated in Figs. 1, 2, and 7, serves to lock the box closed.

With the construction described it is evident that when the padlock is removed the releasing-lever 10 may be raised, thereby releasing the latch 7 from the hook 8, and permitting the springs 4 to throw the cover 2 into open position. (Indicated by full lines in Fig. 4 and by dotted lines in Fig. 3.)

As a means for indicating when there is mail deposited in the box, either for collection by the carrier or for delivery to the proprietor of the box, I provide a signal device and means for automatically setting the same whenever the box-cover is thrown into an opened position. This signal device is preferably in the form of a flag or blade 14, preferably constructed of metal and secured to the free end of an arm 15, which arm is secured to a short rock-shaft 16, journaled in one end flange of the cover 2, and in a bearing 17, secured within and to the top of the said cover. This rock-shaft 16 within the box is formed with a depending arm 18 and is flattened at 19. A leaf-spring 20, secured to the cover 2, as shown in Figs. 4 and 5, engages the flattened surface 19 of said rock-shaft 16 to yieldingly hold the arm 15 projecting approximately at a right angle to the cover 2, as best shown in Fig. 3. The free end of the arm 18 is connected by a light chain or other flexible connection 21 to the front plate of the box or body 1. This chain 21 and the said arm 18 are so disposed with respect to each other and to the arm 15 that whenever the cover 2 is thrown into an open position the said chain will be drawn taut, the arm 18 will be forced into straight line therewith, and the arm 15 and the signal-blade 14 will be set in an operative position with respect to the cover, as shown by full and dotted lines in Fig. 3. Said chain 21 also serves as a stop to limit the opening movement of the cover 2 under the action of the springs 4. When the signaling device is set as just described, the flattened portion 19 of the short rock-shaft 16 is engaged by the retaining-spring 20. Hence the signal device being once set by the opening movement of the cover will be quite securely held in its set position by the said spring after the cover is moved into a closed position. When the signal device is set, it is intended to indicate that mail is deposited in the box, either for collection or for delivery. If the mail-carrier opens up the box to take out mail which is to be collected and does not deposit mail in the box, he should before leaving the box turn the signal device down into an inoperative position, as indicated by dotted lines in Fig. 3. On the other hand, if the owner of the box takes out the mail left by the carrier and does not leave any mail in the box for collection he should turn the said signal down into the inoperative position, as above stated.

To hold letters left in the box for collection, a plurality of spring clamping-fingers 22 are applied to the under surface of the box-cover 2, as shown in Figs. 4 and 6, wherein the character "Z" indicates a letter held by the said fingers.

The box-body 1 is shown as provided at its ends with keepers 23 for holding number-plates 24, that indicate the number of the box. The cover of the box is also shown as provided with a flanged holder 25, which is adapted to hold a name-plate 26.

The construction and action of the box described is thought to be obvious from the foregoing description. The box is simple in construction, is of comparatively small cost, is easily operated, and thoroughly protects the contents of the box from rain, snow, and dust. It will of course be understood that the said box is capable of modification within the scope of my invention, as herein set forth and claimed.

What I claim, and desire to secure by Letters Patent of the United States, is as follows:

1. The combination with a mail-box, having a spring-opened hinged cover, of a pivoted indicator having an arm located within the box, and a flexible connection uniting said arm with the body of the box, and serving as a stop to limit the opening movement of the cover, and to set said indicator, substantially as described.

2. The combination with a mail-box, having a spring-opened hinged cover, and a latch for holding said cover closed, of an indicator pivoted to said cover and having an arm located within the box, a flexible connection uniting said arm with the body of the box and serving to set said indicator when said cover is thrown into an open position, and a spring-retainer for yieldingly holding said indicator in a set position, substantially as described.

3. The combination with the box 1, having the spring-opened hinged cover 2, of the arm 15 pivoted to said cover and provided at its free end with the blade 14, and provided within the box with the arm 18, the flexible connection 21 uniting said arm to said box 1, said connection affording a stop to limit the opening movement of said cover and serving to automatically set said arm and blade in operative position under the opening movement of the cover, and a spring attached to said cover and operating on the shaft of said arm 15 to yieldingly hold the same in a set position, substantially as described.

In testimony whereof I affix my signature in presence of two witnesses.

MATS WICKSTROM.

Witnesses:
 J. L. OLESON,
 J. E. BERGWELL.